(12) United States Patent
Mantai et al.

(10) Patent No.: US 9,790,092 B2
(45) Date of Patent: Oct. 17, 2017

(54) METHOD FOR STARTING UP AN ELECTROLYZER

(71) Applicant: H-TEC SYSTEMS GmbH, Lübeck (DE)

(72) Inventors: Nils Mantai, Lübeck (DE); Claus Würfel, Lübeck (DE); Dennis Wilken, Kastorf (DE); Uwe Küter, Lübeck (DE); Stefan Höller, Lübeck (DE)

(73) Assignee: H-TEC SYSTEMS GMBH, Lübeck (DE)

(*) Notice: Subject to any disclaimer, the term of this patent is extended or adjusted under 35 U.S.C. 154(b) by 583 days.

(21) Appl. No.: 14/372,853

(22) PCT Filed: Dec. 19, 2012

(86) PCT No.: PCT/EP2012/076078
§ 371 (c)(1),
(2) Date: Jul. 17, 2014

(87) PCT Pub. No.: WO2013/107591
PCT Pub. Date: Jul. 25, 2013

(65) Prior Publication Data
US 2014/0377167 A1 Dec. 25, 2014

(30) Foreign Application Priority Data
Jan. 18, 2012 (EP) .................................... 12151643

(51) Int. Cl.
*C25B 15/08* (2006.01)
*C25B 1/12* (2006.01)
(Continued)

(52) U.S. Cl.
CPC .............. *C01B 3/58* (2013.01); *B01J 19/087* (2013.01); *C25B 1/04* (2013.01); *C25B 1/12* (2013.01);
(Continued)

(58) Field of Classification Search
CPC .............. C25B 1/12; C25B 15/08; C01B 3/58
See application file for complete search history.

(56) References Cited

U.S. PATENT DOCUMENTS

| 2007/0137590 A1* | 6/2007 | Vetrovec | .......... F01N 5/02 |
| | | | 123/25 A |
| 2010/0025232 A1* | 2/2010 | Kelly | ............ C25B 1/12 |
| | | | 204/194 |

(Continued)

FOREIGN PATENT DOCUMENTS

| EP | 2 377 972 A1 | 10/2011 |
| JP | 2007 100204 A | 4/2007 |

*Primary Examiner* — Nicholas A Smith
(74) *Attorney, Agent, or Firm* — McGlew and Tuttle, P.C.

(57) ABSTRACT

A method is provided for running up/starting up an electrolysis device (10), which device includes a reactor container (3) which is arranged downstream of an electrolyzer (1) and in which oxygen reacts with hydrogen into water, in order to reduce an oxygen share in a hydrogen gas flow coming from the electrolyzer (1). The electrolysis device (10) is operated with a predefined operating pressure. Upon running up/starting up the electrolyzer (1), the hydrogen gas flow coming from the electrolyzer (1) is led past the reactor container (3) via a bypass conduit (11).

14 Claims, 1 Drawing Sheet

(51) Int. Cl.
*C01B 3/58* (2006.01)
*C25B 15/00* (2006.01)
*C25B 1/04* (2006.01)
*B01J 19/08* (2006.01)
*C25B 9/06* (2006.01)

(52) U.S. Cl.
CPC ............... *C25B 9/06* (2013.01); *C25B 15/00* (2013.01); *C25B 15/08* (2013.01); *Y02E 60/366* (2013.01)

(56) References Cited

U.S. PATENT DOCUMENTS

| 2010/0051473 | A1 | 3/2010 | Okabe et al. |
| 2010/0219066 | A1* | 9/2010 | Takeuchi ............... C25B 1/04 204/242 |
| 2013/0032472 | A1 | 2/2013 | Höller et al. |

* cited by examiner

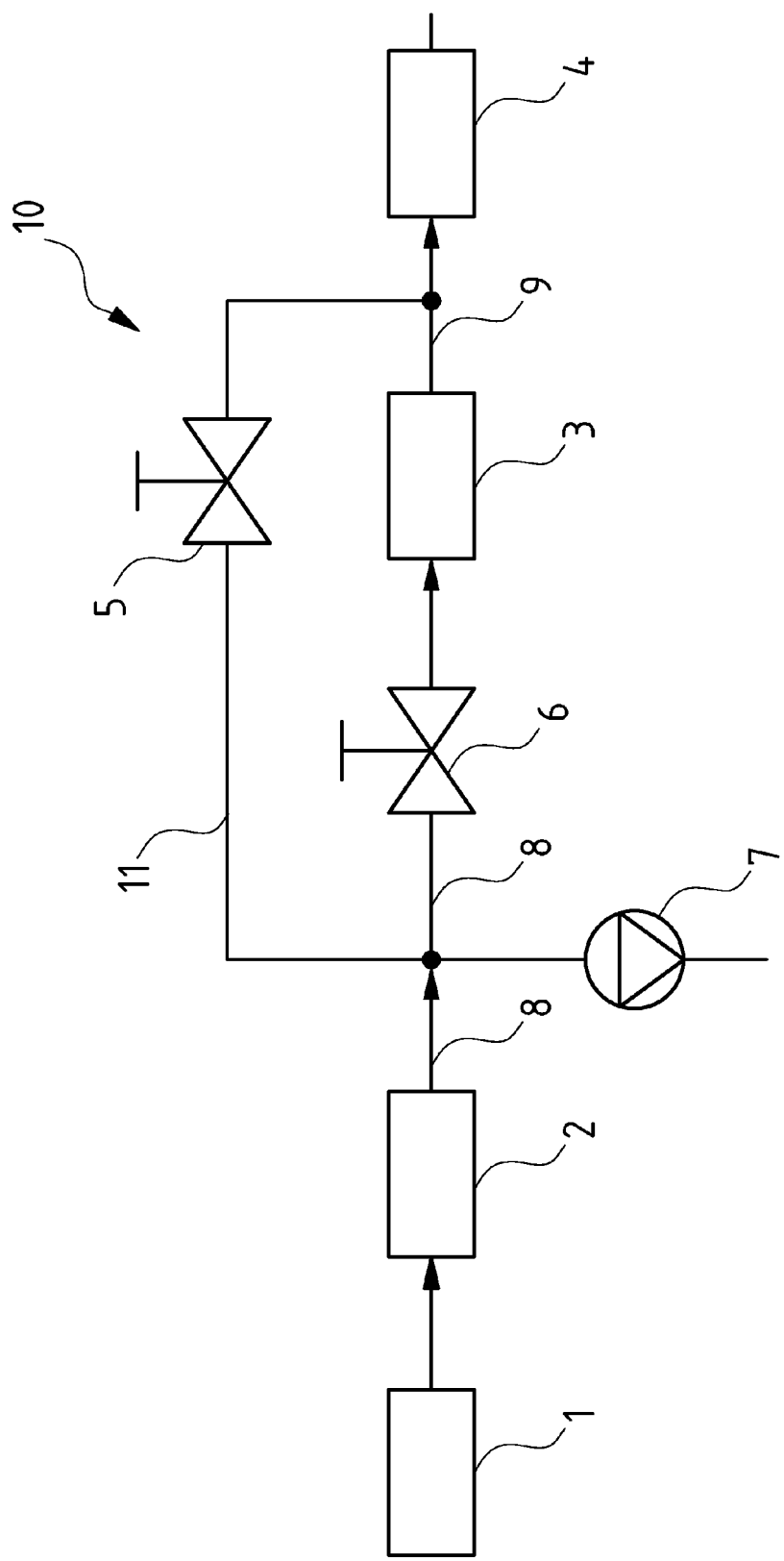

METHOD FOR STARTING UP AN ELECTROLYZER

CROSS REFERENCE TO RELATED APPLICATIONS

This application is a United States National Phase Application of International Application PCT/EP2012/076078 filed Dec. 19, 2012 and claims the benefit of priority under 35 U.S.C. §119 of European Patent Application EP12151643.9 filed Jan. 18, 2012, the entire contents of which are incorporated herein by reference.

FIELD OF THE INVENTION

The invention relates to a method for running up/starting up an electrolysis device and to a device that comprises a reactor container which is arranged downstream of an electrolyzer and in which oxygen reacts with hydrogen into water, in order to reduce an oxygen share in a hydrogen gas flow coming from the electrolyzer, wherein the electrolysis device operates at a predefined operating pressure.

BACKGROUND OF THE INVENTION

According to the state of the art, electrolysis devices which use an electrolyzer for the electrolytic decomposition of water into hydrogen and oxygen are used for creating hydrogen. With electrolysis devices, with which it is a question of a particularly low oxygen content in the produced hydrogen, it is known to provide a reactor container with a catalyst charge (deoxi), in which the oxygen reacts with the hydrogen into water which is then discharged from the system. Since the reactor container operates with charged catalysers, it represents a possible ignition source. For this reason, it is counted as belonging to the state of the art, to flush the reactor container and the complete system with nitrogen or another gas to inert the reactor container and the system, before the starting operation of the electrolysis device, and this then prevents the formation of a gas mixture which is in danger of exploding.

Hereby, the disadvantage is the cumbersome provision of the nitrogen for flushing.

SUMMARY OF THE INVENTION

For this reason, it is an object of the present invention, to provide a method for securely running up/starting up an electrolysis device, as well as a corresponding electrolysis device, with which one can make do without the flushing with nitrogen or another gas for inerting the reactor container and the system.

According to the invention, a method for starting up an electrolysis device is provided, which comprises a reactor container which is arranged downstream of the electrolyzer and in which oxygen is reacted with hydrogen into water, in order to reduce an oxygen share in a hydrogen gas flow coming from the electrolyzer, wherein the electrolysis device operates with a defined operating pressure, wherein the hydrogen gas flow coming from the electrolyzer is led past the reactor container via a bypass conduit, on starting up the electrolysis device.

The basic concept of the present invention is not to flush the reactor container by way of an inert gas as is known from the state of the art, but on starting up the electrolysis device, in particular the electrolyzer, to bypass or circumvent the reactor container arranged downstream, until the process runs in a stable manner and the danger of an explosive mixture which could ignite in the reactor container no longer exists. This has the advantage that on starting up the electrolysis device, in particular the electrolyzer, one can make do without the otherwise cumbersome inert gas flushing. The expense with regard to the apparatus is comparatively low. One merely needs to provide a bypass conduit to the reactor, with suitable valves which in the simplest manner can be designed as shut-off valves in the bypass conduit and upstream of the reactor container, and as a rule an exit-side shut-off device, in particular at the reactor container can be done away with.

Alternatively or in combination with the other method aspects according to the invention, the predefined operating pressure in the reactor container, before the running-up can be lowered to a pressure below the ambient pressure in particular to a pressure below 0.5 bar. The reduction of the pressure within the reactor container serves for softening a possible pressure increase in the case of an explosion. Since the pressure increases by a multiple of 10 in the case of an explosion, a possible pressure increase can also be accordingly lowered given a suitable reduction of the pressure. The installation with regard to design technology can be designed for a lower pressure. Thus, according to the invention, instead of running-up by way of a bypass conduit circumventing the reactor container, a running-up can also be effected without such a bypass conduit as the case may be, if the pressure in the reactor container or in the conduit-connected system components is suitably lowered prior to this. It is particularly advantageous to apply both measures in combination.

According to a further preferred embodiment example, on running-up/starting-up the electrolysis device, in particular, the electrolyzer, a first valve which is arranged in the bypass conduit is opened, in order to lead the hydrogen gas flow coming from the electrolyzer past the reactor container, and a second valve which is arranged in a feed conduit to the reactor container is closed.

Preferably, the first valve is closed and the second valve is opened, on exceeding the upper explosion limit of the hydrogen in the hydrogen gas flow, so that the hydrogen gas flow is led to the reactor container.

The exceeding of the upper explosion limit according to the invention can be determined by way of the measurement of the oxygen content in the conduit leading to the reactor container. What is less cumbersome with regard to installation technology is a temporally controlled flushing of the conduit leading to the reactor container with hydrogen gas produced in the electrolyzer, which is alternatively envisaged according to the invention. Thereby, the flushing quantity is to be dimensioned such that the explosion region can be reliably ruled out, which in particular is the case if one operates with a flushing quantity which corresponds at least to fivefold the rated volume of the conduit to the reactor container.

Advantageously, the predefined operating pressure is greater than 5 bar, in particular greater than 30 bar and preferably lies in a pressure region of 50 to 100 bar. A high operating pressure has the advantage that the exiting hydrogen can be processed without further pumps, i.e. for example can be stored in pressurized storage devices or chemical storage devices.

It is particularly preferable if, when starting up the electrolysis device, system subassemblies, in particular a first subassembly for gas processing, which is arranged upstream of the reactor container, and a second subassembly for gas processing which is arranged downstream of the reactor container, are subjected to throughflow by the hydrogen gas flow coming from the electrolyzer, whilst bypassing the reactor container.

According to the invention, an electrolysis device with an electrolyzer and with a reactor container, in which oxygen reacts with hydrogen into water is provided, wherein a bypass conduit for leading a hydrogen gas flow coming from the electrolyzer, past the reactor container is provided in the electrolysis device.

According to the invention, alternatively to the bypass conduit, or additionally, a vacuum pump for lowering a predefined operating pressure in the reactor container to a pressure below the ambient pressure, in particular to a pressure below 0.5 bar is provided.

Usefully, the reactor container is arranged in the electrolysis device downstream of the electrolyzer.

According to a further preferred embodiment, a first valve, in particular a shut-off valve is provided in the bypass conduit, and a second valve, in particular a shut-off valve is provided in a feed conduit to the reactor container.

Alternatively, a directional control valve, in particular a 3/2-way valve can be provided in the feed conduit to the reactor container and this valve connects the feed conduit selectively to the rector container or to the bypass conduit.

According to a further preferred embodiment, the electrolyzer is a pressure electrolyzer, in particular a proton exchange membrane electrolyzer, wherein the predefined operating pressure at which the electrolyzer operates is greater than 5 bar, in particular greater than 30 bar. The predefined operating pressure particularly preferably lies in a pressure region of 50 to 100 bar.

The reactor container preferably contains a catalyst charge.

The electrolysis device can be run up in a safe manner and without the cumbersome flushing of the reactor container with an inert gas, due to the method according to the invention. A bypass conduit is merely provided parallel to the reactor container, said bypass conduit being able to be opened and closed by way of suitably arranged valves and through which the hydrogen gas produced by the electrolyzer is diverted until the upper explosion limit is exceeded. During this, other system subassemblies are flushed with hydrogen until after the mentioned exceeding of the upper explosion limit hydrogen is then also introduced into the reactor container. The risk on starting up the electrolysis device can be further minimized if the pressure present in the reactor container is lowered by way of a vacuum pump to a pressure below the surrounding or ambient pressure, so that given a formation of an mixture capable of explosion and a subsequent ignition, the deflagration pressure or detonation pressure is accordingly reduced and thus remains below the permissible operating pressure. If the reactor container is evacuated to a pressure of less than 0.5 bar, then given a possibly occurring detonation (oxyhydrogen reaction), a maximal pressure below 5 bar arises, so that the minimal operating pressure of the electrolysis is not thereby exceeded.

The invention is hereinafter explained in more detail by way of one embodiment example represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic representation of a section of an electrolysis device according to one embodiment of the invention.

DESCRIPTION OF THE PREFERRED EMBODIMENTS

Referring to the drawings in particular, the reference numeral 1 characterizes an electrolyzer which here in the embodiment is designed as a proton exchange membrane electrolyzer (PEM). Water is electrolytically broken down into hydrogen and oxygen in the electrolyzer 1. With this method however, due to diffusion through the membrane of the electrolyzer 1, oxygen also gets into the hydrogen in small quantities, so that a residual share of oxygen with a share of 10 to 100 ppm is still present in the thus produced hydrogen.

With the electrolysis device 10 according to the embodiment represented here, it is a question of a low oxygen content in the produced hydrogen. For this reason, apart from different subassemblies 2, 4 for further gas processing, such as for example the first subassembly 2 for gas processing, in which water is removed from the hydrogen gas flow and is discharged out of the electrolysis device 10, a reactor container 3 is arranged downstream of the electrolyzer 1 and the first subassembly 2 for gas processing, in which reaction container 3 the oxygen which is still undesired in the hydrogen gas flow is reduced down to 1 ppm.

It is the case of a reactor container 3 with a catalyst charge, in which the oxygen reacts with the hydrogen into water which is subsequently likewise removed from the electrolysis device 10. Since the reactor container 3 operates with a catalyst charge, this also represents a possible ignition source. For this reason, when starting up the electrolysis device 10, firstly the reactor container 3 is evacuated by way of a vacuum pump 7 to a pressure below the ambient pressure, here to a pressure below 0.5 bar. Simultaneously, a first valve 5 is opened and this valve here is designed as a shut-off valve and is arranged in a bypass conduit 11 which for bypassing the reactor container 3 branches from a first feed conduit 8 to the reactor container 3 and not until downstream of the reaction container 3 is introduced again into the conduit section 9 which leads from the exit of the reactor container 3 to second subassembly 4 for gas processing. A second valve 6 which is arranged in the feed conduit 8 to the reactor container 3 and which is likewise designed as a shut-off valve, is simultaneously closed, so that the hydrogen gas flow which comes from the electrolyzer 1 and from the first subassembly 2 for gas processing does not flow through the reactor container 3 but the bypass conduit 11, in order to be fed to the second subassembly 4 for gas processing, downstream of the reactor container 3.

After exceeding the upper explosion limit, the first valve 5 which is arranged in the bypass conduit 11 is closed, and simultaneously the second valve 6 which is arranged in the feed conduit 8 to the reactor container 3 is opened, so that the hydrogen gas flow flows through the reactor container 3. A temporally controlled flushing with hydrogen gas with a fivefold flushing quantity of the rated volume of the feed conduit 8 is carried out so as to safely exceed the upper explosion limit. Alternatively, the upper explosion limit can however also be determined by way of the measurement of the oxygen content in the hydrogen gas flow.

Alternatively, instead of the shut-off valves 5 and 6, a 3/2 way valve can also be used. Such a 3/2 way valve connects the feed conduit 8 either to the bypass conduit 11 or the reactor container 3.

As the case may be, with the previously described arrangements, a further shut-off valve can be provided downstream of the reactor container 3. A further 3/2-way valve which connects the bypass conduit and the conduit section 9 coming from the reactor container 3, to a conduit leading to the second subassembly 4 can be provided downstream. This second directional control valve is usefully switched synchronously with the first directional control valve.

While specific embodiments of the invention have been shown and described in detail to illustrate the application of the principles of the invention, it will be understood that the invention may be embodied otherwise without departing from such principles.

The invention claimed is:

1. A method for starting up an electrolysis device, the method comprising the steps of:
providing a reactor container which is arranged downstream of an electrolyzer and in which oxygen reacts with hydrogen into water, in order to reduce an oxygen share in a hydrogen gas flow coming from the electrolyzer, wherein the reactor container contains a catalyst charge;
operating the electrolysis device at a predefined operating pressure; and
on starting up the electrolyzer, leading the hydrogen gas flow, coming from the electrolyzer, past the reactor container via a bypass conduit.

2. A method according to claim 1, wherein the predefined operating pressure in the reactor container is lowered to a pressure below the ambient pressure, in particular to a pressure below 0.5 bar, before the starting-up.

3. A method according to claim 1, wherein on starting-up the electrolysis device, a first valve, which is arranged in the bypass conduit, is opened, in order to lead the hydrogen gas flow coming from the electrolyzer past the reactor container, and a second valve, which is arranged in a feed conduit to the reactor container, is closed.

4. A method according to claim 3, wherein on exceeding an upper explosion limit of the hydrogen in the hydrogen gas flow, the first valve is closed and the second valve is opened, so that the hydrogen gas flow is fed to the reactor container.

5. A method according to claim 4, wherein the upper explosion limit is determined by way of a measurement of the oxygen content in the conduit to the reactor container or by way of a temporally controlled flushing of the conduit leading to the reactor container with hydrogen gas, with a flushing quantity which preferably corresponds at least to five-fold the rated volume of the conduit.

6. A method according to claim 1, wherein the predefined operating pressure is greater than 5 bar.

7. A method according to claim 1, wherein on starting up the electrolysis device, a first subassembly for gas processing and which is arranged upstream of the reactor container, and a second subassembly for gas processing and which is arranged downstream of the reactor container are subjected to throughflow by the hydrogen gas flow coming from the electrolyzer, whilst bypassing the reactor container.

8. An electrolysis device comprising:
an electrolyzer;
a reactor container, in which oxygen reacts with hydrogen into water, wherein the reactor container contains a catalyst charge; and
a bypass conduit for leading a hydrogen gas flow coming from the electrolyzer past the reactor container.

9. An electrolysis device according to claim 8 or according to the preamble of claim 8, wherein a pump, in particular a vacuum pump is provided for lowering a predefined operating pressure in the reactor container, to a pressure below the ambient pressure, in particular to a pressure below 0.5 bar.

10. An electrolysis device according to claim 8, wherein the reactor container is arranged downstream of the electrolyzer.

11. An electrolysis device according to claim 8, wherein a first shut-off valve is provided in the bypass conduit, and a second shut-off valve, is provided in a feed conduit to the reactor container.

12. An electrolysis device according to claim 8, wherein a 3/2-way valve is provided in the feed conduit to the reactor container.

13. An electrolysis device according to claim 8, wherein the electrolyzer is a pressure electrolyzer, in a form of a proton exchange membrane electrolyzer, wherein the predefined operating pressure, at which the electrolyzer operates, is greater than 5 bar.

14. An electrolysis device according to claim 8, wherein the predefined operating pressure lies in a pressure region of 50 to 100 bar.

* * * * *